(12) United States Patent
Pruthi et al.

(10) Patent No.: US 7,809,692 B1
(45) Date of Patent: Oct. 5, 2010

(54) METHOD AND SYSTEM FOR GENERATING AND RESTORING A BACKUP IMAGE

(75) Inventors: Arvind Pruthi, Sunnyvale, CA (US); Kiyoshi Komatsu, San Mateo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 282 days.

(21) Appl. No.: 11/701,010

(22) Filed: Jan. 31, 2007

Related U.S. Application Data

(62) Division of application No. 10/777,348, filed on Feb. 11, 2004, now Pat. No. 7,440,965.

(51) Int. Cl.
*G06F 17/30* (2006.01)

(52) U.S. Cl. .................. 707/674; 707/675; 707/676; 707/677; 707/678; 707/680

(58) Field of Classification Search ............ None
See application file for complete search history.

(56) References Cited

U.S. PATENT DOCUMENTS

| | | | |
|---|---|---|---|
| 5,448,718 A | 9/1995 | Cohn et al. | |
| 5,701,480 A | 12/1997 | Raz | |
| 5,752,249 A | 5/1998 | Macon, Jr. et al. | |
| 5,857,203 A | 1/1999 | Kauffman et al. | |
| 6,029,166 A * | 2/2000 | Mutalik et al. ............... | 707/3 |
| 6,141,773 A | 10/2000 | St. Pierre et al. | |
| 6,385,706 B1 | 5/2002 | Ofek et al. | |
| 6,578,121 B1 | 6/2003 | Schutzman | |
| 6,760,823 B1 | 7/2004 | Schutzman | |
| 6,912,630 B1 | 6/2005 | Pillai et al. | |
| 7,039,663 B1 | 5/2006 | Federwisch et al. | |
| 7,103,740 B1 * | 9/2006 | Colgrove et al. ............ | 711/162 |
| 2002/0049883 A1 | 4/2002 | Schneider et al. | |
| 2003/0131209 A1 | 7/2003 | Lee | |
| 2004/0030852 A1 | 2/2004 | Coombs et al. | |
| 2004/0236868 A1 | 11/2004 | Martin et al. | |
| 2005/0071379 A1 | 3/2005 | Kekre et al. | |
| 2005/0114387 A1 | 5/2005 | Evans et al. | |

* cited by examiner

*Primary Examiner*—Baoquoc N To
(74) *Attorney, Agent, or Firm*—Blakely, Sokoloff, Taylor & Zafman LLP

(57) ABSTRACT

A method and system for generating and restoring a backup image are disclosed. According to one aspect of the invention, a server receives a request to generate a backup image. The request includes a selection a backup path. Based on the backup path, the server generates a list of files and/or directories to backup. However, before writing the files to the backup image, the server generates an offset map to indicate where in the backup image each file will be located. The server then writes the offset map to the backup image. During a restore operation, the server receives a request to restore files, including a selection of files and/or directories to restore. The server reads the offset map from the beginning of the backup image to quickly determine the location in the backup image of selected files.

20 Claims, 6 Drawing Sheets

FIG. 4

BITMAP

| INODE NUMBER | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | 0 | 1 | 1 | 0 | 0 | 1 | 1 | 0 | 0 | 1 | 0 | 0 | 1 | 0 | 1 | 0 | 0 |

0 = NOT INCLUDED IN BACKUP IMAGE
1 = INCLUDED IN BACKUP IMAGE

OFFSET MAP 54

| INODE NUMBER | OFFSET (IN FILE DATA) |
|---|---|
| 0 | ... 00 00 00 00 |
| 1 | ... 00 00 00 00 |
| 2 | ... 00 00 08 00 |
| 3 | ... 00 00 00 00 |
| 4 | ... 00 00 00 00 |
| 5 | ... 00 00 1C 00 |
| 6 | ... 00 03 04 00 |
| 7 | ... 00 00 00 00 |
| 8 | ... 00 00 00 00 |
| 9 | ... 00 03 CC 00 |
| 10 | ... 00 00 00 00 |
| 11 | ... 00 00 00 00 |
| 12 | ... 00 04 38 00 |
| 13 | ... 00 00 00 00 |
| 14 | ... 00 15 18 00 |
| 15 | ... 00 00 00 00 |
| 16 | ... 00 00 00 00 |

FILE DATA 56

| ADDRESS | |
|---|---|
| ... 00 00 08 00 | FILE 1 (INODE 2) |
| ... 00 00 1C 00 | FILE 2 (INODE 5) |
| ... 00 03 04 00 | FILE 3 (INODE 6) |
| ... 00 03 CC 00 | FILE 4 (INODE 9) |
| ... 00 04 38 00 | FILE 5 (INODE 12) |
| ... 00 15 18 00 | FILE 6 (INODE 14) |

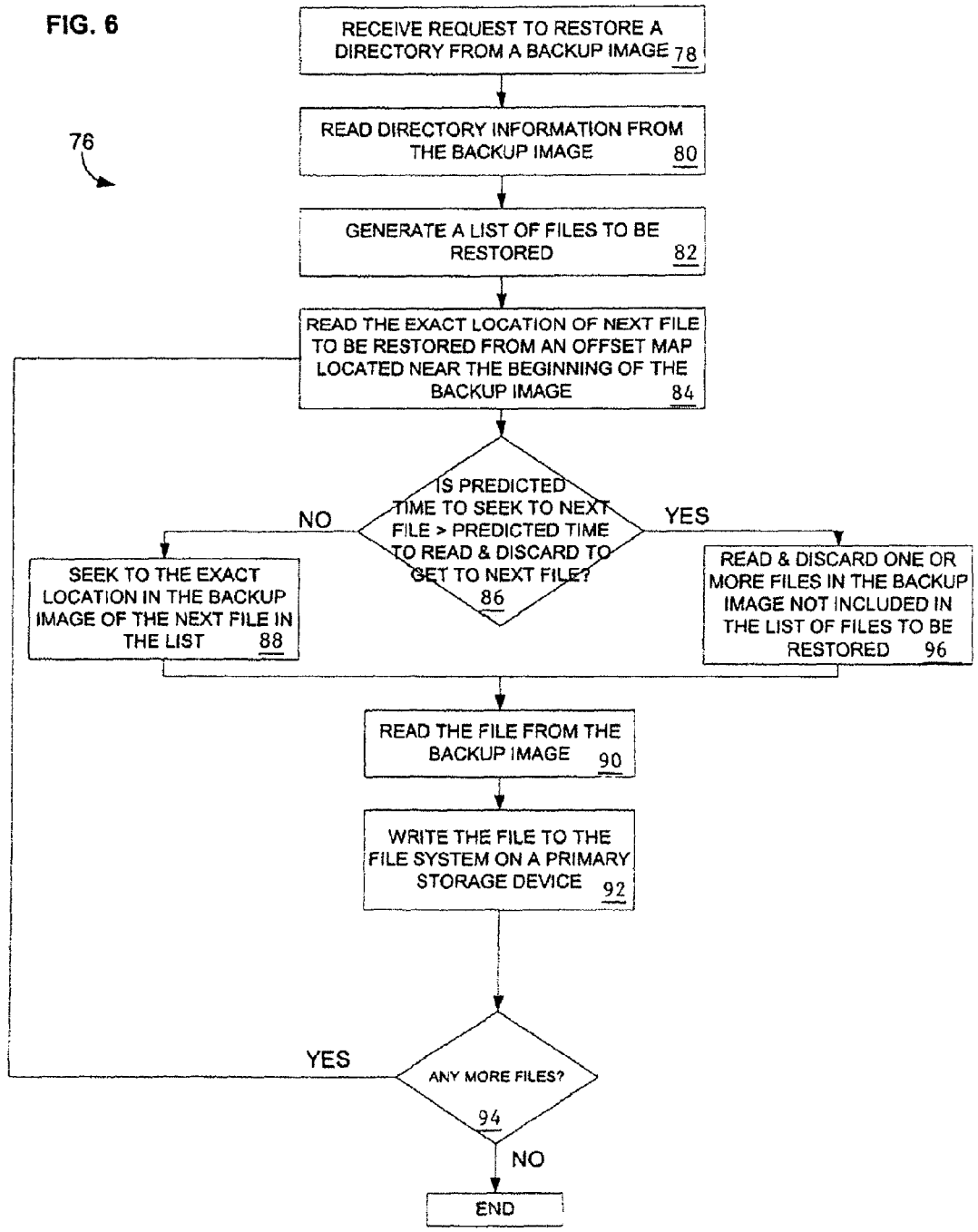

METHOD AND SYSTEM FOR GENERATING AND RESTORING A BACKUP IMAGE

This is a divisional of U.S. patent application Ser. No. 10/777,348, filed on Feb. 11, 2004 and entitled, "METHOD AND SYSTEM FOR GENERATING AND RESTORING A BACKUP IMAGE," which is incorporated herein by reference.

FIELD OF THE INVENTION

The present invention relates generally to data backup systems. More particularly, the present invention relates to an improved method and system for generating and restoring a backup image.

BACKGROUND OF THE INVENTION

Both the capacity and reliability of data storage devices (e.g., disk drives) used in modern day computing systems have been steadily increasing over time. However, despite the increased reliability of modern day storage devices, large and small enterprises alike still require data backups. Implementing a backup scheme for a standard hard drive on a single personal computer is moderately difficult, however, implementing and managing an enterprise-wide backup scheme can be a serious challenge.

One way large enterprises are meeting this challenge is by implementing backup systems based on the Network Data Management Protocol (NDMP). NDMP is an open standard protocol for controlling backup, recovery, and other transfers of data between primary and secondary storage. The NDMP architecture separates the centralized Data Management Application (DMA), data servers and tape servers participating in archival or recovery operations.

One feature of an NDMP backup system that is particularly advantageous is a mechanism for recovering files referred to as Direct Access Recovery (DAR). Recovering a selected group of files from a backup image using a standard recovery operation requires sequentially reading all of the tapes that make up the backup image until all of the files have been recovered. In some cases, this may take hours or even days. However, using DAR, files can be recovered more quickly by reading only the relevant portions of a backup image during a recovery operation.

During a typical DAR operation, an information systems administrator interacts with the graphical user interface of the DMA (e.g., a backup application) to select one or more files to be restored from a particular backup image. After the user selects the files to restore, the DMA communicates a request to a data server to restore the files from a particular backup image. Along with the request, the DMA also communicates file history information to the data server. The file history information is received and stored at the DMA, after being communicated from a tape server to the DMA at the time the backup image is originally generated. The data server extracts the exact location of each file from the file history information and communicates the information back to the DMA. Next, the DMA communicates a request to the tape server to restore the selected files to a particular file system. Because the request includes the exact location in the backup image of each file to be restored, the recovery operation occurs relatively quickly.

Despite the superior performance of DAR compared to the standard recovery operation, DAR has many limitations. Current implementations of DAR are incapable of restoring directories. For example, if the DMA sends a request to restore a directory, the data server simply ignores the request and/or reports an error. This inability to restore directories is particularly problematic when a file's attributes (e.g, owner, read/write/modify permission settings, etc.) are dependent upon the attributes of the directory in which it is stored. Some backup applications simply do not allow the user to select a directory to restore, thereby forcing the user to select, within a directory, each and every individual file that the user would like to backup and/or restore. Other backup applications work around this problem by allowing the user to select a directory to restore via the graphical user interface (GUI) of the backup application, and then expanding the directory to populate the list of files to restore using DAR with the contents of the directory. Although this approach lends the advantages of DAR for restoring files within a directory, this approach is problematic because the directories themselves are not properly restored. In particular the directory and subdirectory attributes are not restored. Without restoring the directory and its attributes, one or more of a file's attributes may not be properly restored. Consequently, this expanded list approach only works for users for whom restoring permissions of directories is not an important issue. In addition, because current implementations of DAR are incapable of handling directories, file systems that support data streams, such as Windows NT®, are not fully supported by DAR.

Furthermore, some current implementations of DAR are inefficient when restoring files that are physically contiguous on a backup tape. For example, often a user will desire to restore two or more files that are physically contiguous on the backup tape. In many cases the file boundary for the two files occurs in the middle of a tape block. When restoring the first file, current implementations of DAR will perform a read operation of the entire block, reading to the end of the first file and then some portion of the beginning of the second file. However, when a read operation is performed to restore the second file, a seek operation must be performed to reposition the tape reading mechanism. The beginning of the second file is then read, despite having been previously read during the read operation performed while restoring the first file. Most modern tape drives are optimized in way that the seek operation can be very expensive. For example, for some digital linear tape (DLT) drives, a seek operation after a few reads to the previous block can take many seconds to finish. Consequently, the restore operation can take a long time.

SUMMARY OF THE INVENTION

The present invention includes a method and apparatus for backing up a directory for use with direct access restore (DAR). According to the method, an offset map is generated to indicate the exact location in a backup image where each file will be located. The offset map is written to the backup image, before any of the files have been written to the backup image.

Other aspects of the present invention will be apparent from the accompanying figures and from the detailed description that follows.

BRIEF DESCRIPTION OF THE DRAWINGS

The present invention is illustrated by way of example, and not by way of limitation, in the figures of the accompanying drawings, in which like references indicate similar elements, and in which:

FIG. 4 is a block diagram illustrating the relationship between the bitmap indicating the files included in the backup image, the offset map and the file data for one embodiment of the present invention;

FIG. 6 is a flowchart illustrating a method of restoring a directory from a previously written backup image according to one embodiment of the present invention.

DETAILED DESCRIPTION

Figure 1:
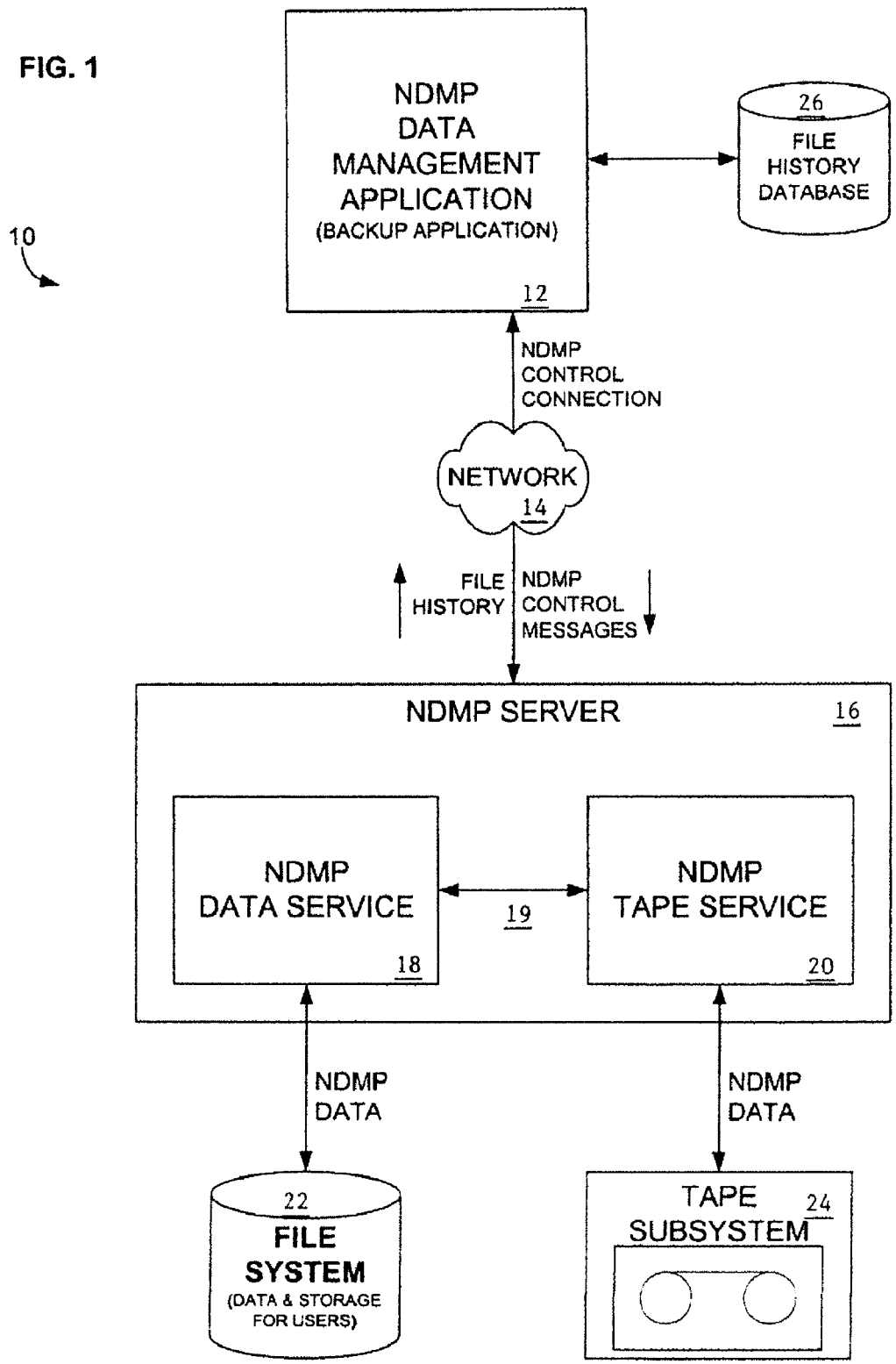
FIG. 1 illustrates an example of a network environment supporting the Network Data Management Protocol in which the present invention can be implemented.

A method and system for generating and restoring a backup image are described. In the following description, for purposes of explanation, numerous specific details are set forth in order to provide a thorough understanding of the present invention. It will be evident, however, to one skilled in the art that the present invention may be practiced without these specific details.

Consistent with one embodiment of the present invention, a data service executing on a file server receives a request to generate a backup image from a data management application. The request includes a backup path indicating a file, directory or volume to include in the backup image. The data service analyzes the backup path received in the request and generates a list of all files to be included in the backup image. Next, the data service analyzes each file in the list of files to be included in the backup image and generates an offset map. The offset map indicates the exact offset in the backup image where each file will be located. The data service writes the list and the offset map near the beginning of the backup image. Finally, the data service writes each file in the list to the backup image.

The present invention also includes a method to restore files from a previously written backup image. According to one embodiment of the invention, a data service executing on a file server receives a request to restore files and/or directories to a file system. The request includes an nlist including a list of inodes associated with files and/or directories in a backup image. Based on the inodes in the nlist, the data service reads directory structure information from the backup image and determines which files and/or directories in the backup image to restore. Next, the data service generates the required directory structure on the file system. For each file to be restored, the data service reads offset values from an offset map located near the beginning of the backup image. Based on the offset values, the data service determines the exact location in the backup image of each file to restore. For each file, the file server seeks to the correct location, reads the file and writes the file to the file system.

The present invention provides several advantages over previous backup and restore operations. By generating an offset map that indicates the exact location of each file in the backup image, and writing the offset map near the beginning of the backup image, before the files are written to the backup image, the present invention makes it possible to quickly recover files during a restore operation. If the offset map is written at the end of the backup image, after each file has been written to the backup image, a restore operation would take much longer. Furthermore, the present invention makes it possible to quickly restore directories and special files, such as files having associated streams. Previous direct access restore operations did not allow for the complete and proper recovery of files within a directory, and or stream files associated with a file.

FIG. 1 illustrates an example of a network environment 10 in which the present invention can be implemented. The network environment 10 illustrated in FIG. 1 supports the Network Data Management Protocol (NDMP). The NDMP and its corresponding architecture are based on a client-server model. In the NDMP architectural scheme, an NDMP compliant backup application, which is referred to as a Data Management Application (DMA) 12, is considered to be the client. For example, as illustrated in FIG. 1, the DMA 12 interacts over a network 14 with the NDMP server 16 to manage the transfer of data between the NDMP data service 18 and the tape service 20, both of which reside on the NDMP server 16.

The data service 18 provides an abstracted interface to the file system 22 or primary storage of the NDMP server 16. The data service 18 is the source of data during backup operations and the destination of data during recovery operations. Examples of data services are file servers and general compute platforms with direct or Storage Area Network (SAN) attached storage.

The tape service 20 provides an abstracted interface to the tape subsystem 24 or any other type of secondary storage device attached to the NDMP server 16. A tape subsystem 24 can implement its own NDMP server and associated tape service or it can be connected through an external NDMP server 16, as illustrated in FIG. 1. The tape service 20 is the source of data during recovery operations and the destination of data during backup operations. The tape service 20 also provides a mechanism for tape positioning and input/output on behalf of the DMA 12. Examples of tape services 20 are individual tape drives, tape libraries, or servers with one or more writeable compact disc drives.

An NDMP session is an instantiation of a pair of NDMP services, for example, data service 18 and tape service 20, with a data connection 19 between the two services and control connections between the DMA 12 and each service. The DMA 12 creates and controls the NDMP session by establishing a control connection and issuing NDMP control messages. During a backup operation, the DMA 12 will receive file history information over the NDMP control connection from the NDMP server 16 and store the file history information in a file history database 26.

Figure 2:
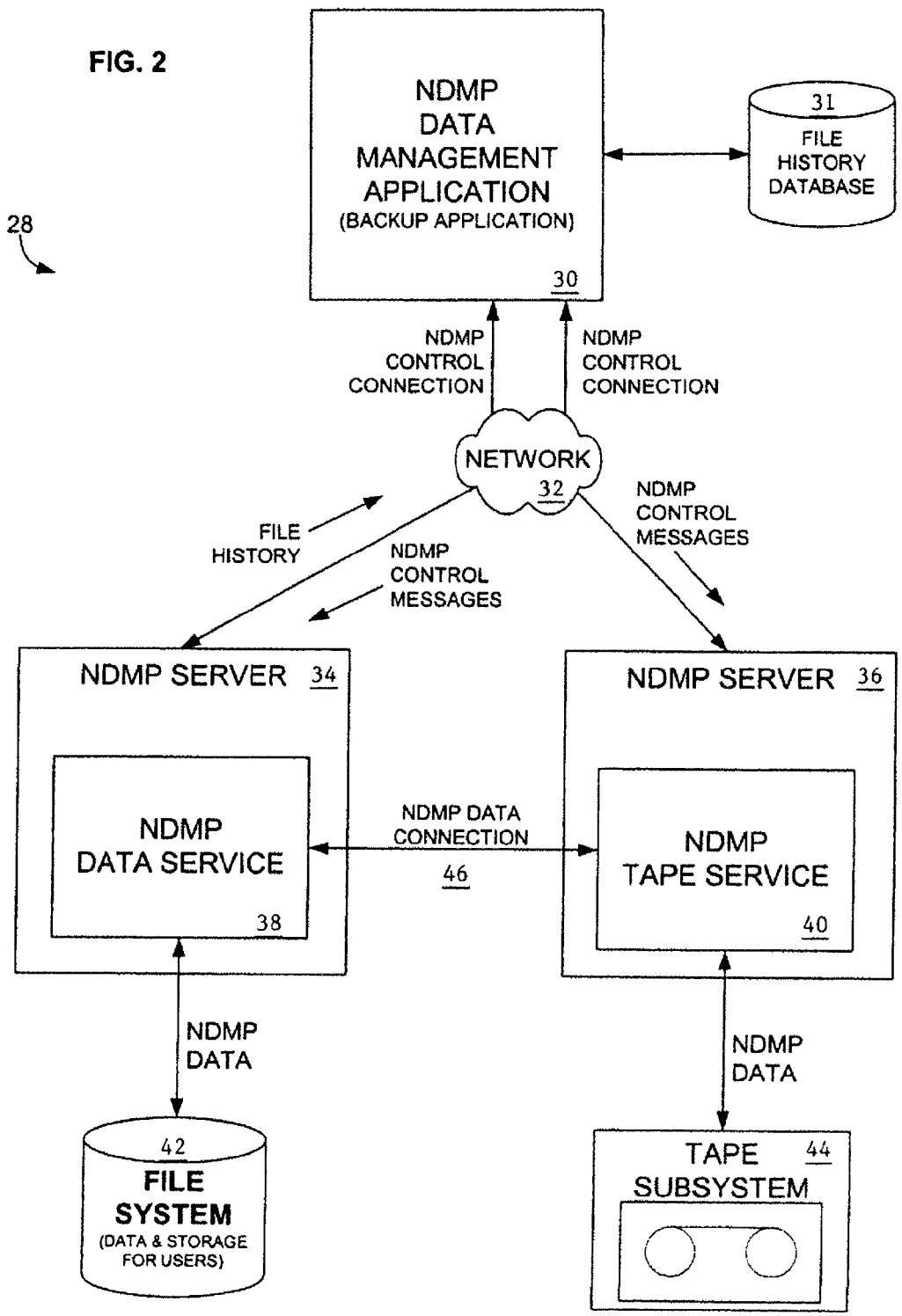
FIG. 2 illustrates an example of a network environment supporting the Network Data Management Protocol in which the present invention can be implemented.

FIG. 2 illustrates an alternative example of a network environment 28 in which the present invention can be implemented. The network environment 28 illustrated in FIG. 2 is similar to the network 10 of FIG. 1, however, in the network 28 of FIG. 2, the data 38 and tape services 40 have been implemented on separate NDMP servers 34 and 36. In FIG. 2, the DMA 30 interacts over network 32 with NDMP servers 34 and 36, managing the transfer of data between the NDMP data service 38 on NDMP server 34 and the tape service 40 on NDMP server 36. The data service 38 provides an abstracted interface to the file system 42 of the first NDMP server 34, while the tape service 40 provides an abstracted interface to the tape subsystem 24 attached to the second NDMP server 36. The data 38 and tape services 40 are interconnected via an NDMP data connection 46. During a backup operation, the DMA 30 will receive file history information from the data service 38 on NDMP server 34 and store the file history information in a file history database 31.

Figure 3:
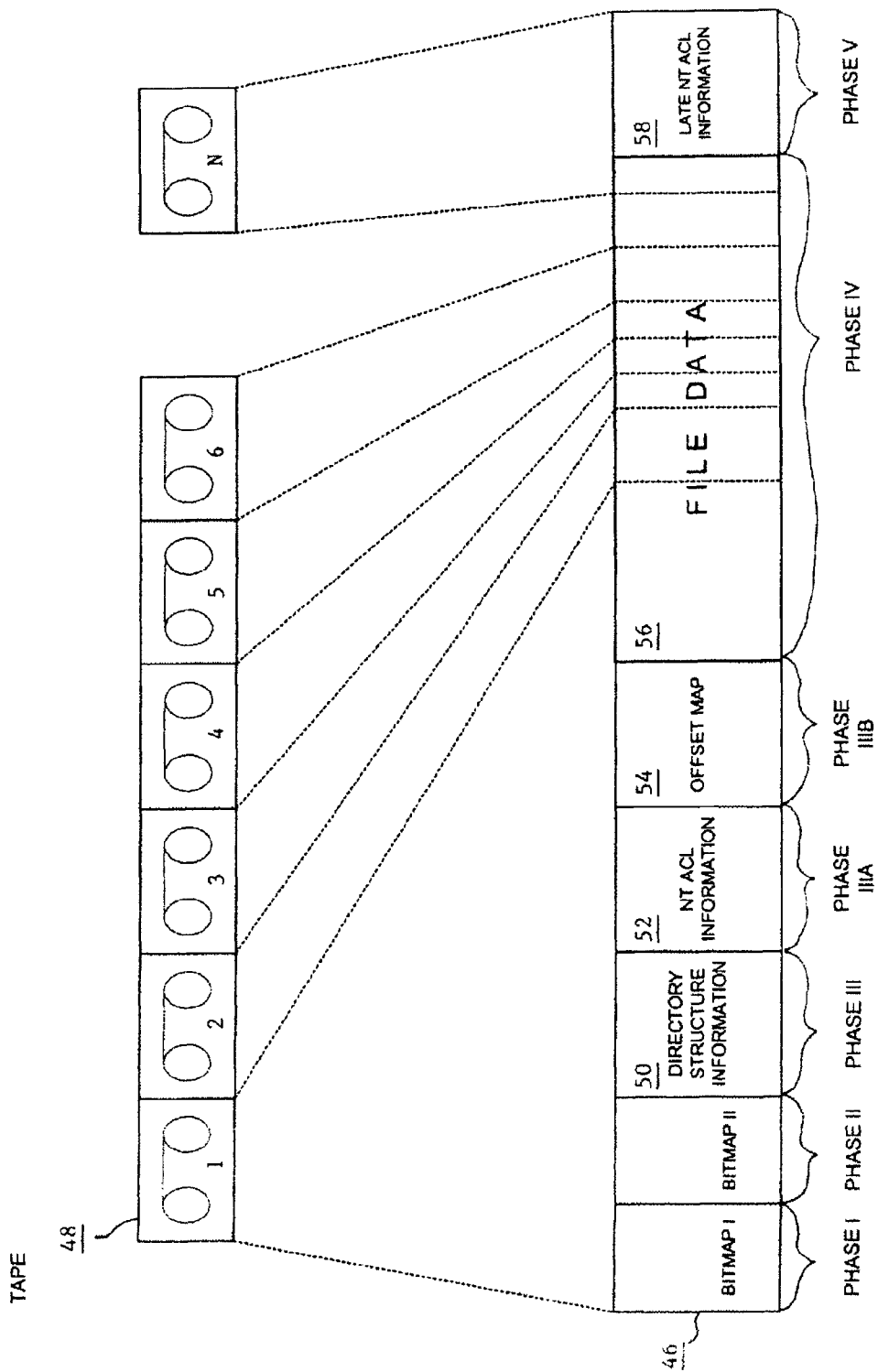
FIG. 3 illustrates an example of a backup image on several backup tapes consistent with the present invention.

FIG. 3 illustrates an example of a backup image 46 on several backup tapes 48 consistent with one embodiment of the present invention. As indicated in FIG. 3, a single backup image 46 may span several tapes 48. For example, in FIG. 3, the backup image 46 spans N tapes 48. The first tape includes the results of phase I, II and III of the backup operation, including: bitmap I, bitmap II, directory structure 50, NT ACL information 52, offset map 54, and the beginning of the file data 56. Tapes two through six contain file data 56, while tape N contains the last of the file data 56 and NT ACL information 58. It will be appreciated that several factors will affect the size of the backup image 46, including the total number of files on the file system 22 and the number of files and/or directories included in the backup image 46. Consequently, the number of backup tapes 48 or rewritable compact discs required to store a particular backup image 46 will vary.

For one embodiment of the present invention, the NDMP data service 18 executing on the NDMP server 16 processes a request to generate a backup image 46 in several phases. Accordingly, during each phase, the NDMP server 16 generates a portion of the backup image 46. For one embodiment of the invention, the data service 18 generates a backup image 46 in five distinct phases, as illustrated in FIG. 3.

During phase I, the data service 18 generates a list of all the files that are to be included in the backup image 46. For one embodiment, the list is in the form of a bitmap, such as bitmap I in FIG. 3. The list is generated based on the backup path received from the DMA 12. The backup path is the full pathname of a file or directory on a file system 22, or may include the name of a volume. For example, if the path name specifies a particular directory on the file system 22, the data service 18 analyzes the corresponding directory and adds any files that are contained within the directory to the list of files to be included in the backup image 46. Furthermore, subdirectories and their contents may also be added to the list of files to be included in the backup image 46.

In addition, for one embodiment of the invention, if the backup path received from the DMA 12 specifies a filename, the data service 18 analyzes the corresponding file to determine whether the file has any associated streams. If the file has any associated streams, the data service 18 adds the associated stream files to the list of files to be included in the backup image 46. For example, some file systems, such as Write Anywhere File Layout (WAFL) used with the Data Ontap operating system from Network Appliances, Inc. of Sunnyvale, Calif., store all the data streams associated with a particular file in a separate directory. Consequently, when the data service 18 encounters an NT file that has associated streams, the data service 18 adds the directory containing the streams, as well as the files comprising the streams, to the list of files to be included in the backup image 46.

For one embodiment of the invention, during Phase II of generating the backup image 46, the data service 18 generates a list of files to be included in an incremental backup image. In FIG. 3, bitmap II represents a list of files to be included in an incremental backup image. During an incremental backup, only files and directories that have been modified since the time of the previous backup are included in the backup image. If the data service 18 receives a request to perform an incremental backup, the data service 18 will analyze all of the files and/or directories on the file system 22 that were included in the original backup and determine which of those files and/or directories have been modified. If a file or directory has been modified, the data service 18 will add the file or directory to the list of files included in the incremental backup image.

During Phase III, the data service 18 analyzes the directory structure of the file system 22 and generates directory structure information 50. The directory structure information 50 includes information related to the relationship, or hierarchy, of the directories on the file system 22. In addition, directory attributes (e.g., owner, read/write/modify permission settings, etc.) are analyzed and included in the directory structure information 50.

The data service 18 analyzes NT Access Control Lists (ACL) and generates NT ACL information 52 for the backup image 46 during Phase IIIA. For example, for each file in the list of files to be included in the backup image 46, the data service 18 reads NT ACL information for the file and then adds the information to the backup image 46.

During Phase IIIB of the backup process, the data service 18 generates an offset map 54 for the backup image 46. The offset map 54 indicates the exact location of each file in the backup image 46. To generate the offset map 54, the data service 18 must calculate the amount of space each file in the list of files included in the backup image 46 will occupy on the tape. For one embodiment of the invention, this calculation is performed during Phase I, when the list of files to be included in the backup image 46 is generated. In an alternative embodiment, the calculation is performed during Phase IIIB, prior to writing the offset map 54 to the backup image 46.

In either case, to properly calculate the amount of space each file will occupy in the backup image 46, the data service 18 must compensate for any holes in the file, as the file is stored on the file system 22. For example, many file systems allocate disk space for a file when the file is originally created on the file system. However, a file may not actually occupy all of the space that the operating system of the file server has allocated for it. Consequently, the amount of actual data that makes up a particular file may be less than the size of the file as reported by the operating system of the file server. Generally, the allocated but unused bits of data are written to all zeros. This unused portion of a file is referred to as a hole. Copying the hole to the backup image 46 is inefficient and therefore not desirable. Consequently, the data service 18 must calculate the amount of actual data that a particular file contains, excluding any holes, when it is preparing the offset map 50.

For one embodiment of the invention, to properly calculate the amount of space each file will occupy in the backup image 46, in addition to compensating for holes, the data service 18 must also compensate for any headers that are to be added for each file as it is stored in the backup image 46. Most backup applications embed these headers as a part of the backup image 46 for every file. The embedded headers usually describe the data following the header. For example, the header may describe if any of the data following the header contains holes. This is important because in case of holes, even though no data is written to the backup image, it is important to know about the presence and position of holes within a file so that the restore operation can restore a file including the holes, exactly as it were, prior to the backup. These headers occupy space within the backup image for a file. Thus, they need to be taken into account when calculating the amount of space each file will take on tape.

Once the offset map 54 has been generated, the data service 18 generates the actual file data 56 for the backup image 46 during Phase IV. When reading files to add to the backup image 46, the data service 18 excludes any holes in the files. For one embodiment of the invention, the files are read in ascending order of their associated inode number. This corresponds with the order of the files in the list generated by the data service 18.

Finally, in Phase V, the data service 18 generates additional NT ACL information 58 for the backup image 46. For one embodiment of the present invention, NT ACL information 58 is added to the end of the backup image 46 so that the backup image 46 is backwards compatible with previous versions of DAR and/or other restore operations.

For one embodiment of the present invention, the data service 18 processes the list of file and directory names received from the DMA 12 by analyzing the inodes associated with the file and directory names. For example, for one embodiment of the invention, the list of files to be included in the backup image 46, generated by the data service 18, is actually a list of inode numbers that correspond with files on the file system 22. To further limit the amount of space the list occupies in the backup image 46, for one embodiment of the present invention, the list is in the form of a bitmap, such as bitmap I and II in FIG. 3. The bitmap has a number of bits equal to the number of available inodes on the file system 22, and each bit in the bitmap corresponds with an inode on the file system 22. The value of each bit in the bitmap indicates whether or not the particular file associated with the inode is included in the backup image 46. A bit set to one indicates the corresponding file or directory is included in the backup image 46, whereas a bit set to zero indicates that the file or directory is not included in the backup image 46.

FIG. 4 illustrates an example of a bitmap, such as bitmap I or II of FIG. 3, and its relationship to the offset map 54 and the file data 56. The portion of bitmap I illustrated in FIG. 4 includes only the first seventeen bits of the entire bitmap. Each of bits zero through sixteen of bitmap I correspond with inode numbers zero through sixteen on the file system 22. Moreover, bits zero through sixteen are associated with files on the file system 22 with inode numbers zero through sixteen. Consequently, as illustrated in FIG. 4, the file that corresponds with inode number two is included in the backup image 46 because bit number two is set to one. Similarly, the files that correspond with inode numbers five, six, nine, twelve and fourteen are also included in the backup image 46. Inode number one, which is set to one, indicates a directory that is included in the backup image. Because a directory takes up no space in the file data 56 section of the backup image 46, there is no corresponding offset value in the offset map 54 for the directory that corresponds with inode 1.

For one embodiment of the present invention, the offset map 54 is an array of bytes representing offset addresses for files in the backup image 46. If the file corresponding with the element number is not included in the backup image, the bytes for that particular element are set to all zero. For example, as illustrated in FIG. 4, element number zero, which corresponds with the file or directory having inode number zero, is set to all zeros indicating that it is not included in the backup image 46. This is consistent with bitmap I, which has bit zero set to zero. However, element number two, which corresponds with the file or directory with inode number two, is set to the 8-byte address (only four bytes are shown) presented in hexadecimal as " . . . 00 00 08 00." This is also consistent with bitmap 1, which shows bit number two set to one. Similarly, element numbers five, six, nine, twelve and fourteen of the offset map 54 contain offset values for the files associated with inode numbers five, six, nine, twelve and fourteen respectively.

FIG. 4 also illustrates the relationship between the offset map 54 and the file data 56. For example, in FIG. 4, the first file in the file data 56 portion of the backup image 46, having inode number 2, begins at the address represented in hexadecimal format as " . . . 00 00 08 00." Similarly, the fourth file, with inode number 9, is at location " . . . 00 03 CC 00", which corresponds with the address provided in element number nine of the offset map 54.

For one embodiment of the present invention, the data service 18 calculates the offset value for each file by adding a base offset value to an offset value equal to the size of the previous file in the list of files to be included in the backup image. For example, given a list of inodes corresponding to files to be included in the backup image, the data service 18 begins with the smallest inode number, which corresponds with the first file that will be written to the tape.

Referring to FIG. 4, the smallest inode number associated with a file to be included in the backup image is inode number 2. Assuming the data service 18 has already written the NT ACL information 52 and the current tape position or offset is the location where the offset map will be located, to calculate the offset value for the file with inode number 2, the data service adds the total size of the offset map to the current offset. As illustrated in FIG. 4, the resulting offset value is the location of file 1 with inode number 2, or " . . . 00 00 08 00." Next, to generate the offset value for the next file, with inode number 5, the data service adds the size of file 1 (with inode number 2) to the offset value calculated for file 1 to get " . . . 00 00 1C 00." The data service 18 repeats this calculation process for all files in the list of files to be included in the backup image 46.

One advantage of the present invention is the location of the offset map 54 near the beginning of the backup image 46. Similar to the table of contents in a book, the offset map 54 is located near the very beginning of the backup image 46 on the first tape. Just as a reader of a book can turn to the table of contents to find the exact page of a particular chapter, the server 16 can direct the reading mechanism of the tape subsystem 24 to the correct tape, and the exact location on the tape, for a particular file. It will be appreciated that the offset map need not be the very first item in the backup image, but should generally be located near the beginning such that the tape subsystem 24 can quickly seek to the location of the offset map.

For one embodiment of the present invention, the server 16 verifies that the offset value calculated and written in the offset map 54 for each file is the actual offset location that the file is written to. For example, when the tape service 20 writes each file to the tape on the tape subsystem 24, the tape service 20 reports to the data service 18 the actual location to which each files is written. The data service 18 compares the location received from the tape service 20 to the corresponding offset value in the offset map 54. For one embodiment of the invention, if the offset values in the offset map 54 accurately identify the actual offset location for each file, the server 16 communicates a verification message to the DMA 12 indicating that the offset map 54 is accurate.

Consequently, the DMA can check the verification message received from the server 16 to determine whether a DAR operation to restore a directory from the backup image is possible. For example, during a DAR restore operation, the DMA will verify that it received a verification message from the server 16 when the backup image 46 was originally generated. If a verification message was received, it indicates that the offset map is included in the backup image and accurately reflects the offset, or location, of each file in the backup image 46.

During a directory DAR operation, a user interacts with the graphical user interface of the DMA 12 to select files and/or directories to restore to the file system 22. After the user has selected the files and/or directories to restore, the DMA generates a request, including a list of files to restore, and communicates the request to the server 16. In response to receiving the request to restore files and/or directories, the data service 18 of the server 16 reads directory structure information 50 from the backup image 46. Based on the directory structure information, and the files and directories indicated in the request, the data service generates a list of files and/or directories to restore. For example, if the data service 18 determines that a file included in the request to restore has associated stream files stored in a particular directory in the backup image, the data service will add the directory containing the streams files, as well as the actual stream files, to the list of files and directories to be restored. Similarly, if the data service 18 determines that a directory restore has been requested, the data service 18 will add each file in the particular directory to the list of files to restore.

After the data service 18 has generated the list of files and/or directories to restore, the data service 18 writes the required directory structure to the file system 22. Next, the data service 18 reads offset values from an offset map 54 for each file included in the list of files to restore. After the data service 18 has read the offset value for each file in the list of files to restore, the server 16 seeks to each file and reads each file from the backup image 46. The tape service communicates each file to the data service 18 over the data connection 19 and the data service 18 writes each file to the file system 22.

For one embodiment of the present invention, when the server is reading files from the tape and restoring them to the file system, the tape service 20 reads several files without an intervening seek operation. For example, the data service 18 analyzes the offset values for the files to be restored. If the data service 18 determines that two or more files are located physically close together on the tape, the DMA 12 will request that the tape service read multiple files without an intervening seek operation. Any file that is read, but not being restored, is simply discarded from the read buffer and not written to the file system. By reading several files into memory consecutively without an intervening seek operation, the server can save valuable time when files are located physically contiguously.

Figure 5:
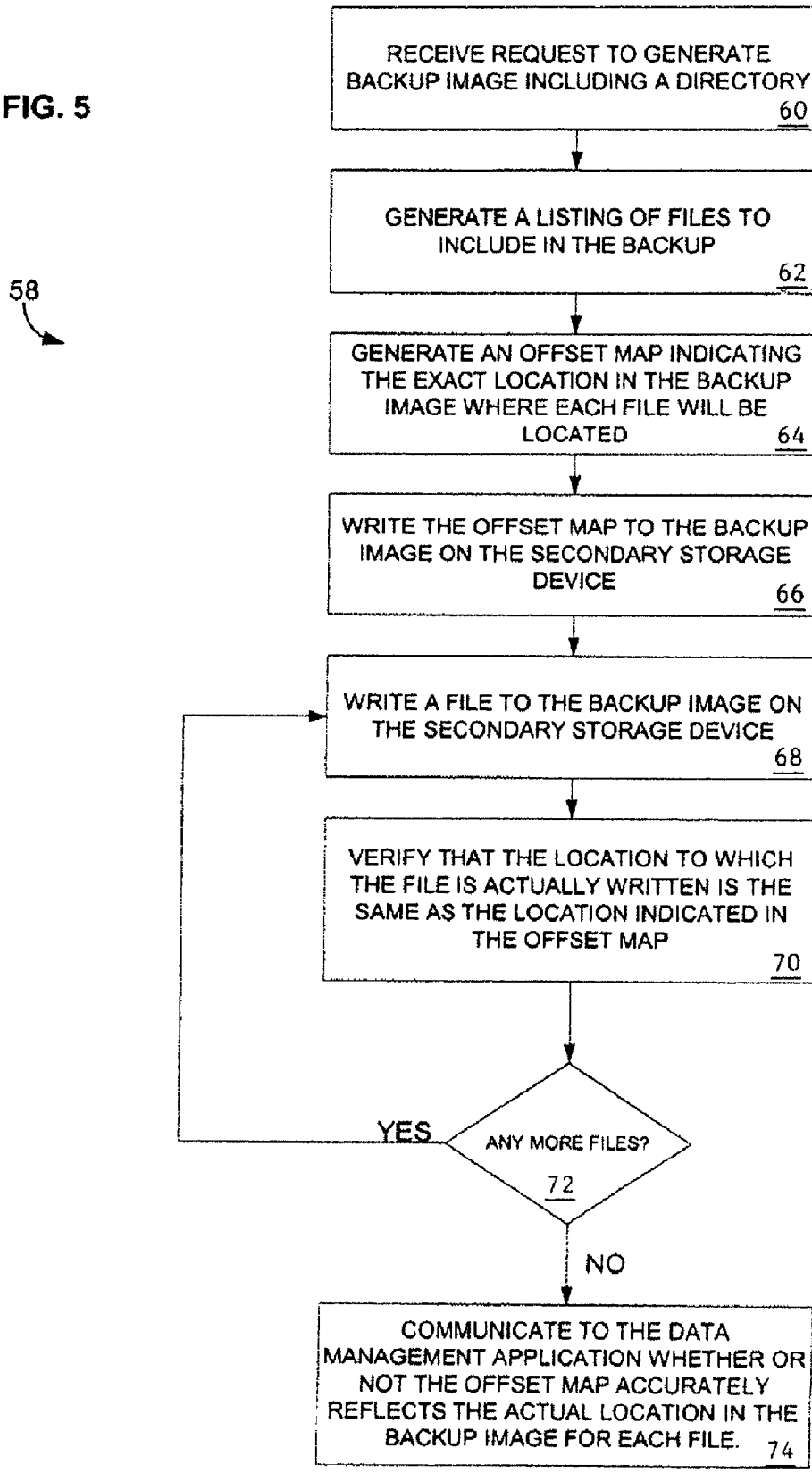
FIG. 5 is a flowchart illustrating a method of generating a backup image according to one embodiment of the present invention.

FIG. 5 illustrates a method for generating a backup image 46, according to one embodiment of the present invention. Consistent with the present invention, a user interacts with the DMA 12 to select a file, directory or entire volume to backup. For example, a user interacts with the graphical user interface of the DMA 12 to select a directory on the file system 22 that the user would like to backup to tape on the tape subsystem 24. Once the user has selected the directory to be included in the backup image 46, the DMA 12 generates a backup path for the selected directory and communicates the request to generate the backup image 46, including the backup path, to the NDMP server 16.

At operation 60 of FIG. 3, the server 16 receives the request to generate the backup image 46 from the DMA 12. Based on the backup path indicated in the request, the data service 18 of the NDMP server 16 processes the backup path to generate a list of files and directories to include in the backup image 46 at operation 62. Because the backup path included in the request received from the DMA 12 may include a directory name or the name of a file that has associated streams, it is necessary for the data service 18 to process the backup path to identify all of the files that will be included in the backup image 46. For example, if the backup path indicates a directory, the data service 18 will add to the list of files to be included in the backup image 46 all of the files within the selected directory.

Next, at operation 64, the data service 18 generates an offset map 54 indicating the exact location in the backup image 46 where each file will be located. At operation 66, the offset map 54 is written to the backup image 46 on the secondary device. The data service 18 then begins to write each file in the list to the backup image 46 on the secondary storage device during operation 68. For one embodiment of the invention, the data service 18 communicates file history information to the DMA 12 while writing each file to the backup image. Alternatively, the data service 18 may communicate file history information related to each file in the backup to the DMA 12 just before, or after, writing each file to the backup image 46. After writing a file to the backup image 46 at operation 68, the data service 18 verifies that the actual location to which the file was written is the same as the location indicated in the offset map 54 at operation 70. Next, at operation 72, the data service 18 determines whether each file from the list has been written to the backup image 46. If not, the data service 18 writes the next file in the list to the backup image 46. However, when all the files have been written to the backup image 46, the data service 18 communicates to the DMA 12 whether or not the offset map 54 accurately reflects the location of each file in the backup image 46.

FIG. 6 illustrates a method 76, consistent with one embodiment of the present invention, to restore a selection of files and/or directories to a file system 22 from a previously written backup image 46. According to one embodiment of the present invention, at operation 78, a file server 16 receives from a DMA 12 a request to restore files and/or directories from a backup image 46 to a file system 22. At operation 80, the file server 16 reads the required directory structure information 50 from the backup image 46 and generates the corresponding directory structure on the file system 22. At operation 82, the file server 16 generates a list of files to be restored. For one embodiment of the present invention, the file server generates the files on the file system as empty files before reading the actual file data from the backup image 46. Next, at operation 84, the file server 16 reads offset values from an offset map 54 located near the beginning of the backup image 46. Each offset value indicates the location in the backup image 46 of a file from the list generated during operation 82.

At operation 86, the file server 16 determines whether any of the files should be read in groups, without an intervening seek operation. If files are not located close together in the backup image, then the files are read individually with a seek operation being performed for each file. For example, at operation 86 the file server 16 determines whether the predicted time required to seek to the next file is greater than the predicted time to read and discard one or more intervening files that are not to be included in the restore operation. For one embodiment of the invention, the predicted seek time and the predicted time to read and discard are based on attributes or parameters of the tape subsystem 44, or backup device, as well as the calculated difference between the location of two files in the backup image 46.

If the predicted seek time to the next file is less than the predicted time to read and discard any intervening files, then at operation 88, the server 16 seeks to the exact location of the next file to be restored. At operation 90, the file is read from the backup image 46. The file is written to the file system 22 at operation 92. At operation 94, the file server 16 determines whether there are any more files in the list to be restored.

If, however, at operation 86 the file server 16 determines that the predicted seek time to the next file is greater than the predicted time to read and discard any intervening files, then at operation 96 the file server reads and discards one or more files not in the list of files to be restored. For example, the file server 16 compares the predicted time it would take to seek from the end of one file to the beginning of the next file with the predicted time it would take to simply read one or more files before the target file (e.g., the next file to be restored), without an intervening seek operation. If the comparison of predicted times suggests that the next file can be read more quickly without an intervening seek, then the file server 16 reads and discards files not included in the list of files to restore at operation 96. At operation 90, the target file is read from the backup image. At operation 92, the file is written to the file system 22. At operation 94, the file server determines whether all the files have been restored, and if not, the process is repeated.

Thus, a method and system for generating and restoring a backup image are provided with reference to specific example embodiments. It will be evident that various modifications and changes may be made to these embodiments without departing from the broader spirit and scope of the invention. Accordingly, the specification and drawings are to be regarded in an illustrative rather than a restrictive sense.

We claim:

1. A method comprising:
    generating, by a storage server, a backup image offset map indicating an offset that specifies a relative location where a file is stored in the backup image;
    storing, by the storage server, the backup image offset map in a portion of the backup image;
    receiving, by the storage server, a request to restore a plurality of files on a file system;
    for each file in the plurality of files to be restored, reading, by the storage server, the corresponding offset value from the backup image offset map;
    seeking to the relative location where the file is located using the corresponding offset value;
    reading the file from the location in the backup image; and
    writing the file to the file system.

2. A method as recited in claim 1, further comprising:
    prior to reading the offset values from the backup image offset map, receiving a request to restore files and/or directories from a backup image to a file system, the request indicating a selection of files and/or directories to restore; and
    generating the list of files to be restored based on the request to restore files and/or directories.

3. A method as recited in claim 2, wherein the request includes an nlist, the nlist comprising a list of inodes corresponding to files and/or directories in a backup image.

4. A method as recited in claim 3, wherein said generating the list of files to be restored based on the request to restore files and/or directories includes, for every inode in the nlist that corresponds with a file, determining whether the corresponding file has any associated streams and, if so, adding the streams to the list of files to be restored.

5. A method as recited in claim 3, wherein said generating the list of files to be restored based on the request to restore files and/or directories includes, for every inode in the nlist, determining whether the inode corresponds with a directory and, if so, adding all files located within the directory to the list of files to be restored.

6. A method as recited in claim 2, further comprising:
    for each file in the list of files to be restored, reading file attribute information associated with the file from the backup image; and
    writing the file attribute information to the file system.

7. A method as recited in claim 6, wherein the file attribute information includes Access Control List information.

8. A method as recited in claim 1, further comprising:
    determining, based on the offset values, whether multiple files in the list of files to be restored should be read from the backup image and written to the file system without an intervening seek operation.

9. A method as recited in claim 8, wherein determining, based on the offset values, whether multiple files in the list of files to be restored should be read from the backup image and written to the file system without an intervening seek operation includes comparing the predicted time required to seek to the location of a file with the predicted time required to read and discard one or more files in the backup image not included in the list of files to be restored.

10. A method as recited in claim 1, wherein multiple files are read from the backup image and written to the file system without an intervening seek operation only if the predicted time required to seek to a file is greater than the predicted time required to read and discard a file in the backup image that is not included in the list of files to be restored.

11. A server comprising:
    a processor;
    a network communication interface to provide the server with data communication with a plurality of clients, including a data management application, over a network;
    a storage interface to provide the server with data communication with a set of mass storage devices; and
    a memory containing code which, when executed by the processor, causes the server to execute a process of generating a backup image on behalf of the data management application, the process comprising:
    generating a backup image offset map indicating an offset that specifies a relative location where a file is stored in the backup image;
    storing the backup image offset map in a portion of the backup image;
    receiving a request to restore a plurality of files on a file system;
    for each file in the plurality of files to be restored, reading the corresponding offset value from the backup image offset map;
    seeking to the relative location where the file is located using the corresponding offset value;
    reading the file from the location in the backup image; and
    writing the file to the file system.

12. A server as recited in claim 11, wherein the process further comprises:
    prior to reading the offset values from the backup image offset map, receiving a request to restore files and/or directories from a backup image to a file system, the request indicating a selection of files and/or directories to restore; and
    generating the list of files to be restored based on the request to restore files and/or directories.

13. A server as recited in claim 12, wherein the request includes an nlist, the nlist comprising a list of inodes corresponding to files and/or directories in a backup image.

14. A server as recited in claim 13, wherein said generating the list of files to be restored based on the request to restore files and/or directories includes, for every inode in the nlist that corresponds with a file, determining whether the corresponding file has any associated streams and, if so, adding the streams to the list of files to be restored.

15. A server as recited in claim 13, wherein said generating the list of files to be restored based on the request to restore files and/or directories includes, for every inode in the nlist, determining whether the inode corresponds with a directory and, if so, adding all files located within the directory to the list of files to be restored.

16. A server as recited in claim 13, wherein the process further comprises:
    for each file in the list of files to be restored, reading file attribute information associated with the file from the backup image; and
    writing the file attribute information to the file system.

17. A server as recited in claim 16, wherein the file attribute information includes Access Control List information.

18. A server as recited in claim 11, wherein the process further comprises:

determining, based on the offset values, whether multiple files in the list of files to be restored should be read from the backup image and written to the file system without an intervening seek operation.

19. A server as recited in claim 18, wherein determining, based on the offset values, whether multiple files in the list of files to be restored should be read from the backup image and written to the file system without an intervening seek operation includes comparing the predicted time required to seek to the location of a file with the predicted time required to read and discard one or more files in the backup image not included in the list of files to be restored.

20. A server as recited in claim 11, wherein multiple files are read from the backup image and written to the file system without an intervening seek operation only if the predicted time required to seek to a file is greater than the predicted time required to read and discard a file in the backup image that is not included in the list of files to be restored.

* * * * *